United States Patent Office 3,525,642
Patented Aug. 25, 1970

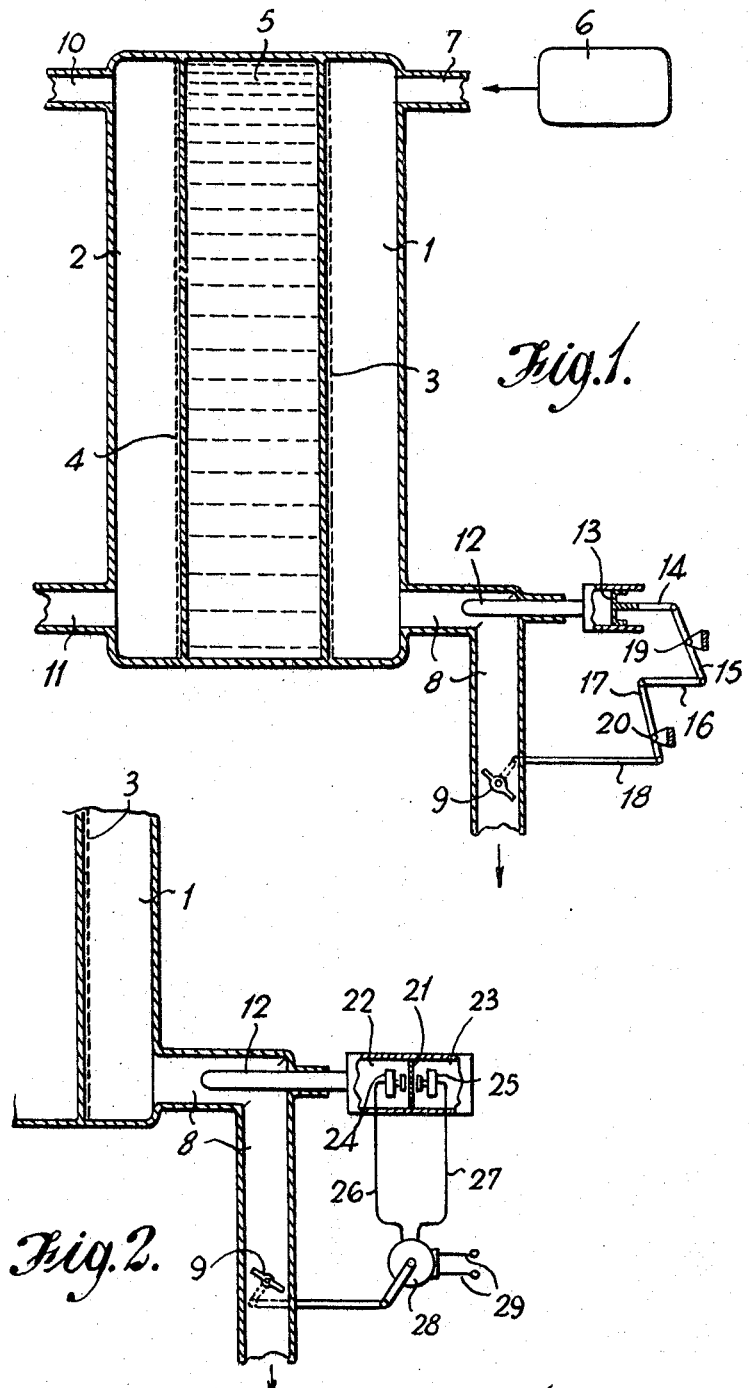

3,525,642
FUEL REACTOR WITH CONTROL SYSTEM
Donald Keith Ross, Wareham, Dorset, England, assignor to Energy Conversion Limited, London, England, a British company
Filed Apr. 7, 1966, Ser. No. 540,940
Claims priority, application Great Britain, Apr. 15, 1965, 16,203/65
Int. Cl. H01m 27/12; G01n 7/10
U.S. Cl. 136—86     10 Claims

ABSTRACT OF THE DISCLOSURE

A control system for fuel reactors such as fuel cells is constructed as part of the exhaust system for the reactor to detect the partial pressure of unreacted fuel present in the exhaust gases of the reactor, and the sensing of the partial pressure of the fuel is used to control the flow of fuel containing fluid to the reactor.

---

Figure 3:
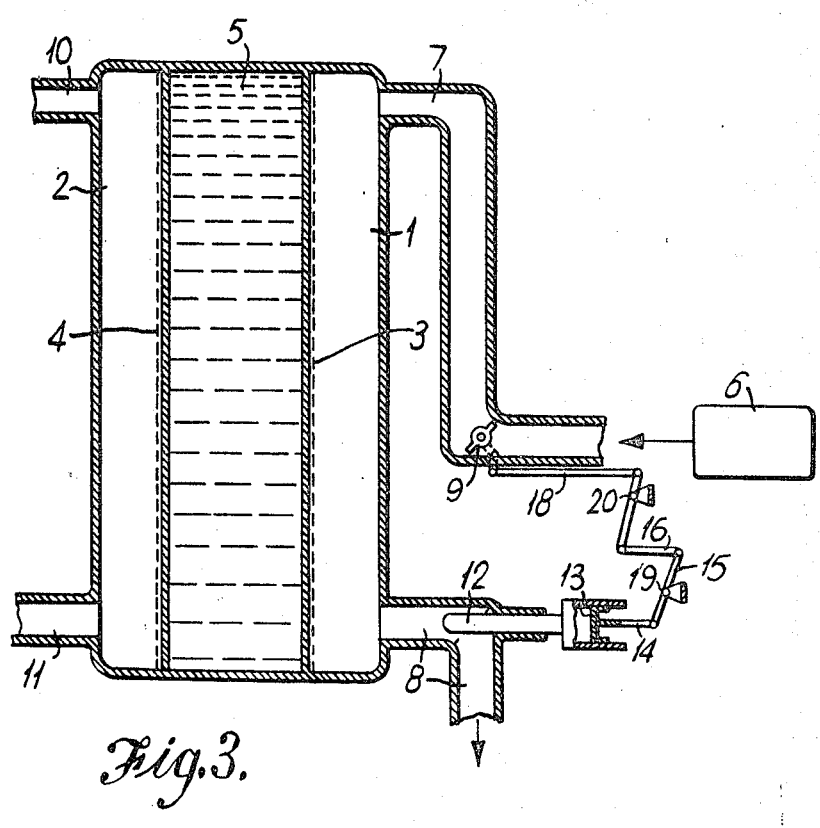

This invention relates to control systems for fuel reactors, such as fuel cells.

In such systems, in order not to conduce towards conditions in which there is insufficient fuel to meet demands for a particular reaction, it is usually arranged that the supply of fuel is excessive. Where an impure source of fuel is used, or where the fuel is derived from a fuel-containing source of supply, it is necessary, in order to purge impurities from the reactor, for the fuel side to exhaust and there is therefore, in effect, normally a proportion of unreacted fuel in the exhaust from the reactor. It will be evident that it is advantageous to arrange that the amount of unreacted fuel appearing in the exhaust should be a minimum but in order that a condition of variation in the demand for fuel can be met, it is desirable for the supply to be carefully controlled so that it can be ensured that at no time is there a deficiency.

It is an object of the present invention to provide a system of control to meet such conditions.

In accordance with the invention, a control system for a fuel reactor, such as a fuel cell, arranged for use with a fuel-containing fluid and in which a proportion of fuel is exhausted from the reactor in unreacted form means is provided in the or part of the exhaust stream for sensing the partial pressure of the unreacted fuel therein, said sensing means being arranged to control the flow of fuel-containing fluid to the reactor.

It will be apparent that control in accordance with the invention may be achieved by taking a representative sample of the exhaust stream and sensing the proportion of unreacted fuel in the sample stream; the sampling might even be intermittent.

When the reactant for the reactor is hydrogen, rather than using pure hydrogen, the fuel may be arranged to be hydrogen-containing and it will be the partial pressure of the unused hydrogen in the exhaust from the reactor that is sensed in a control system in accordance with the invention.

In accordance with a feature of the invention, in a control system for use with a hydrogen reactor fed from a hydrogen-containing gas supply, said sensing means comprises a hydrogen diffusing membrane exposed to the or part of the exhaust stream of or from the reactor, said membrane having associated therewith a closed chamber the pressure within the chamber being dependent upon the partial pressure or hydrogen in the exhaust stream or part thereof and variation of pressure within the said chamber is arranged to control the flow of hydrogen-containing gas to the reactor.

Such a system is particularly suitable for controlling fuel supplies to a number of parallel fuel cell units. If one side of a palladium/silver alloy membrane, ideally with a large area/volume ratio, such as in the form of a thimble, is positioned within the exhaust stream of each of the parallelled units, then change of hydrogen pressure in the exhausts will cause change of pressure at the other side of each thimble. By associating each of the thimbles with a small chamber having a diaphragm, the chamber being filled with hydrogen to the pressure desired in the exhaust stream plus an inert gas to make up to the exhaust stream pressure for the initial setting of the valve position, change of pressure will cause deflection of the diaphragm and this deflection can be transformed into a mechanical or electrical, force or signal that is used to control the fuel feed to each of the units, in the correct sense. Basically, such a system is limited in that it is possible to control only under constant load conditions and some adaptation is probably necessary to cope with varying load conditions.

However, by arranging for the diaphragm in such an arrangement to be backed by a second chamber containing an inert gas at a suitable reference pressure, then the diaphragm may be set to operate to give a differential force or signal and the system becomes applicable to cope with different, and possible varying, loads.

The sensitivity of the thimble chamber in either of the arrangements can be increased by the use of a filling of pure hydrogen in the chamber.

It will be seen that the principal advantage of the methods of control according to the invention is that it is the relevant parameter itself, that is the partial pressure of unreacted fuel in the exhaust stream, which is monitored.

Embodiments of the invention will now be described, by way of example, with reference to the accompanying, somewhat diagrammatic drawings of which FIG. 1 shows the application of the invention to the control of hydrogen supply to the fuel side of a fuel cell, said control being effected by a direct mechanical linkage.

FIG. 2 shows, fragmentally, a fuel cell similar to that shown in FIG. 1 but in which the control utilizes an indirect arrangement. FIG. 3 is a fragmentary side sectional view which shows an alternative arrangement similar to that illustrated by FIG. 1. It will be understood that the description is limited to a single fuel cell and that, in practice, where a battery of fuel cells is used, a control system substantially as described would be necessary for each individual cell of the battery.

In FIG. 1, a fuel cell is represented by anode chamber 1 backing a negative electrode 3 of suitable form, such as porous metal or hydrogen diffusing membrane material, and a cathode chamber 2 backing a positive electrode 4 of suitable form. An electrolyte is provided in chamber 5 between the electrodes 3 and 4. The anode chamber 1 is fed from a supply 6 of impure hydrogen through duct 7 and hydrogen from the impure gas in the anode chamber 1 is brought into contact with the electrolyte 5 by passage through the anode 3. The impurities in the gas exhaust from the cell through outlet duct 8 which includes a control valve 9; the latter is shown as a butterfly-type of valve but can be of any suitable form. With the impurities, a certain proportion of unreacted hydrogen is also exhausted, so that there is a partial pressure of hydrogen in the exhaust gases in the duct 8. The fuel gas supply 6 is maintained under pressure and there is a pressure drop across the cell from inlet duct 7 to outlet duct 8.

Air, or oxygen, is supplied to the cathode chamber 2 through inlet duct 10 and unused gas(es) exhaust(s) through outlet duct 11.

In accordance with the invention, a hydrogen permeable membrane, such as of palladium or silver/palladium alloy, of tubular form, as the thimble 12, as shown, or of any other suitable form, is arranged in duct 8 in the exhaust gas stream. The membrane is associated with a pressure sensitive device, such as a flexible diaphragm forming a wall of a chamber 13 in communication with the interior of the thimble. It may be necessary to provide heating means for said diffusion membrane to raise the temperature thereof for the purpose of putting the membrane into a state suitable for diffusion or of increasing the rate of diffusion.

The device 12 is connected by links, such as 14, 15, 16 and 17, to the means, such as a link 18, for operating the control valve 9, the links 15 and 17 being pivoted about axes 19 and 20 respectively.

The variation of the partial pressure of hydrogen in the outlet duct 8 causes similar variation of pressure in the wall 13 as the result of the ensuing change of volume of hydrogen diffusing through the membrane 12; and this variation of pressure in the chamber causes movement of the flexible diaphragm 13. This movement of the diaphragm, in turn affects the setting of the control valve 9 through the linkage system and it is arranged that, as the demand for hydrogen by the cell increases, so the linkage moves to set the control valve 9 for greater throughput of the exhaust gas, which brings about an appropriate increase of input of fuel gas through inlet 7.

In the arrangement of FIG. 2, only part of the fuel side of the cell is shown as the form of the armature of the cell and system will be obvious from reference to FIG. 1.

The pressure sensitive diaphragm 21 of a chamber 22 associated with the interior of the thimble 12 is backed by a further chamber 23 which is pressurised with gas, preferably an inert gas, such as hydrogen, so as to provide a reference pressure against which the diaphragm is arranged to operate. The reference pressure is preferably equivalent to a median partial pressure of hydrogen in the outlet duct 8.

The diaphragm is provided with contacts which, for a preselected limit of movement of the diaphragm, make contact with one or other of the contacts 24 and 25 on either side of the diaphragm. These contacts are adapted to complete one or other of two circuits shown at 26 and 27, for energisation of a motor 28 in one direction or the other, to control the setting of the control valve 9 in dependence upon the demand for fuel gas. Leads 29 are arranged for connection to a power supply for the motor 28.

In either of the embodiments described above, with reference to FIGS. 1 and 2, it is to be understood that the control valve 9 may be positioned alternatively in the supply inlet 7 as illustrated in FIG. 3. However, in these cases it will probably be necessary to provide a constriction at the outlet gas stream to ensure sufficient back pressure.

It is evident that the duct 8 may be such as to carry only a representative portion of the exhausting gas and that, in obvious manner, a main duct may be provided in such a case, to carry the major portion of the exhausting stream. The control system described would then function in a similar manner. The valve 9 would be provided in the main duct and, also in obvious manner, separate valve means may be provided in the subsidiary duct. The latter valve means may be adapted to enable the control to be effected on an intermittent basis, that is by arranging for the valve means to open only for certain periods during operation of the cell. It is to be understood that the scope of the invention is not restricted to the art of fuel cells; it may be applied to any system in which a fuel gas is reacted. Thus, an arrangement consisting of parts represented by the anode chamber 1, gas supply 6, inlet duct 17 and exhaust duct 8 with the associated hydrogen partial pressure control, may be used for an hydrogenation process, pure hydrogen being provided for reaction at the other side of a hydrogen permeable wall member, taking the place of anode 3, of a reaction chamber, taking the place of electrolyte chamber 5. The invention is generally applicable to any reaction system where the partial pressure of a reaction gas in the exhaust from the system varies in accordance with the demand for the reacting gas for the particular reaction.

I claim:

1. A fuel reaction system adapted to be connected to a supply of fuel-containing fluid for the provision of fuel to be reacted in the system, comprising means for exhausting a main stream of fluid from the system and means for exhausting a separate control stream of fluid from the system, it being arranged that said exhausting fluid streams should contain a proportion of unreacted fuel and comprising a control system therefor, said control system including sensing means associated with said control stream of exhausting fluid, said sensing means being sensitive to substantially only the partial pressure of fuel present in the exhaust stream and being arranged to effect control of the flow of said fuel-containing fluid to the system.

2. A fuel reaction system as claimed in claim 1, wherein means is provided in said control stream of exhausting fluid for effecting control intermittently.

3. A fuel reaction system as claimed in claim 1, wherein said sensing means comprises a pressure sensitive device having associated therewith diffusion membrane means forming part of a closed chamber with flexible diaphragm means, said diaphragm means being arranged to effect control of the input of fuel-containing fluid to the reactor.

4. In a fuel reaction system wherein a supply of fuel-containing fluid circulates to provide fuel to be reacted in the system and a stream of fluid containing unreacted fuel is exhausted from the system, the improvement of a control system comprising sensing means associated with at least a part of the exhaust stream of the reaction system, said sensing means being sensitive only to partial pressure of fuel present in the exhaust stream and substantially insensitive to the partial pressure of other components of said exhaust stream and means connecting said sensing means to flow regulation means to effect control of the flow of said fuel-containing fluid in said fuel reaction system.

5. A system as claimed in claim 4 wherein said sensing means comprises a diffusion membrane which is permeable to said fuel and impermeable to other components of said exhaust stream.

6. A system as claimed in claim 5 wherein hydrogen gas is the fuel and said diffusion membrane is a hydrogen diffusion membrane.

7. A system as claimed in claim 6 wherein said hydrogen diffusion membrane is of tubular form.

8. A system as claimed in claim 4 wherein said sensing means comprises a diffusion membrane formed at least in part of palladium.

9. A fuel cell which utilizes hydrogen as the fuel comprising a supply of a hydrogen containing gas stream, an exhaust conduit through which a stream of gas containing unreacted hydrogen passes, a hydrogen diffusion membrane positioned in said conduit and pressure-sensitive means associated with said membrane to sense the pressure of hydrogen that diffuses through said membrane from said conduit.

10. A fuel cell as claimed in claim 9 wherein said membrane is a palladium metal containing thimble, the open end of which connects to a pressure chamber containing a pressure sensitive element.

References Cited

UNITED STATES PATENTS

| | | | |
|---|---|---|---|
| 3,112,228 | 11/1963 | Young | 136—86 |
| 2,400,940 | 5/1946 | McCollum | 55—158 X |
| 2,787,903 | 4/1957 | Beard | 73—23 |
| 2,811,037 | 10/1957 | Beard | 73—23 |
| 2,906,798 | 9/1959 | Starnes et al. | 196—132 X |

ALLEN B. CURTIS, Primary Examiner

U.S. Cl. X.R.

73—23; 196—132; 260—698